US012642386B2

(12) United States Patent
Rossetto et al.

(10) Patent No.: US 12,642,386 B2
(45) Date of Patent: Jun. 2, 2026

(54) MACHINE AND METHOD FOR PREPARING COFFEE BEVERAGES

(71) Applicant: DE'LONGHI APPLIANCES S.R.L. CON UNICO SOCIO, Treviso (IT)

(72) Inventors: Giovanni Rossetto, Treviso (IT); Claudio Cristofoli, Treviso (IT)

(73) Assignee: DE'LONGHI APPLIANCES S.R.L. CON UNICO SOCIO, Treviso (IT)

( * ) Notice: Subject to any disclaimer, the term of this patent is extended or adjusted under 35 U.S.C. 154(b) by 577 days.

(21) Appl. No.: 18/013,724

(22) PCT Filed: Jun. 29, 2021

(86) PCT No.: PCT/IT2021/050201
§ 371 (c)(1),
(2) Date: Dec. 29, 2022

(87) PCT Pub. No.: WO2022/003743
PCT Pub. Date: Jan. 6, 2022

(65) Prior Publication Data
US 2023/0276980 A1      Sep. 7, 2023

(30) Foreign Application Priority Data

Jun. 30, 2020    (IT) ........................ 102020000015805

(51) Int. Cl.
*A47J 31/52*          (2006.01)
*A23F 5/26*           (2006.01)
*A47J 31/42*          (2006.01)
(52) U.S. Cl.
CPC ............... *A47J 31/525* (2018.08); *A23F 5/26* (2013.01); *A47J 31/42* (2013.01); *A47J 31/5255* (2018.08)

(58) Field of Classification Search
CPC ...... A47J 31/525; A47J 31/5255; A47J 31/42; A47J 31/10; A47J 31/4457; A47J 31/4403; A47J 31/4407; A47J 31/441; A47J 31/462; A47J 2203/00
USPC ................. 99/279, 280, 285, 289, 294, 295
See application file for complete search history.

(56) References Cited

U.S. PATENT DOCUMENTS

| | | |
|---|---|---|
| 2012/0196009 A1 | 8/2012 | Casado Gomez et al. |
| 2018/0220832 A1 | 8/2018 | Psarologos et al. |
| 2019/0014942 A1* | 1/2019 | Juve ...................... A47J 31/467 |
| 2019/0335944 A1* | 11/2019 | Zuidervaart ........ A47J 31/3623 |

FOREIGN PATENT DOCUMENTS

| | | |
|---|---|---|
| EP | 2314183 A1 | 4/2011 |
| KR | 2020 0028971 A | 3/2020 |

OTHER PUBLICATIONS

International Search Report and Written Opinion issued Nov. 10, 2021 in PCT/IT2021/050201.

* cited by examiner

*Primary Examiner* — Phuong T Nguyen
(74) *Attorney, Agent, or Firm* — Panitch Schwarze Belisario & Nadel LLP

(57) ABSTRACT

Some embodiments described here concern a machine for preparing coffee beverages by infusing a coffee powder in an infusion unit. Other embodiments concern a method to prepare a coffee beverage, including a step of pre-infusing and a step of infusing the coffee powder.

14 Claims, 3 Drawing Sheets

| | | | | | | | | | | |
|---|---|---|---|---|---|---|---|---|---|---|
| INPUT | Espresso coffee beverage | | | | | | | | | |
| INPUT | Single filter | | | | | | | | | |
| INPUT | Granulometry level | pos. | 1 | 2 | 3 | 4 | 5 | 6 | 7 | 8 |
| OUTPUT | Water flow rate FR | % | A1 | A2 | A3 | A4 | A5 | A6 | A7 | A8 |
| OUTPUT | Water Quantity WQ | ml | B1 | B2 | B3 | B4 | B5 | B6 | B7 | B8 |
| OUTPUT | Pause Duration PT | sec | C1 | C2 | C3 | C4 | C5 | C6 | C7 | C8 |
| INPUT | Espresso coffee beverage | | | | | | | | | |
| INPUT | Double filter (x 2) | | | | | | | | | |
| INPUT | Granulometry level | | 1 | 2 | 3 | 4 | 5 | 6 | 7 | 8 |
| OUTPUT | Water flow rate FR | % | D1 | D2 | D3 | D4 | D5 | D6 | D7 | D8 |
| OUTPUT | Water Quantity WQ | ml | E1 | E2 | E3 | E4 | E5 | E6 | E7 | E8 |
| OUTPUT | Pause Duration PT | sec | F1 | F2 | F3 | F4 | F5 | F6 | F7 | F8 |
| INPUT | Americano coffee beverage | | | | | | | | | |
| INPUT | Single filter | | | | | | | | | |
| INPUT | Granulometry level | | 1 | 2 | 3 | 4 | 5 | 6 | 7 | 8 |
| OUTPUT | Water flow rate FR | % | G1 | G2 | G3 | G4 | G5 | G6 | G7 | G8 |
| OUTPUT | Water Quantity WQ | ml | H1 | H2 | H3 | H4 | H5 | H6 | H7 | H8 |
| OUTPUT | Pause Duration PT | sec | I1 | I2 | I3 | I4 | I5 | I6 | I7 | I8 |
| INPUT | Americano coffee beverage | | | | | | | | | |
| INPUT | Double filter (x 2) | | | | | | | | | |
| INPUT | Granulometry level | | 1 | 2 | 3 | 4 | 5 | 6 | 7 | 8 |
| OUTPUT | Water flow rate FR | % | L1 | L2 | L3 | L4 | L5 | L6 | L7 | L8 |
| OUTPUT | Water Quantity WQ | ml | M1 | M2 | M3 | M4 | M5 | M6 | M7 | M8 |
| OUTPUT | Pause Duration PT | sec | N1 | N2 | N3 | N4 | N5 | N6 | N7 | N8 |
| INPUT | "Coffee" coffee beverage | | | | | | | | | |
| INPUT | Single filter | | | | | | | | | |
| INPUT | Granulometry level | | 1 | 2 | 3 | 4 | 5 | 6 | 7 | 8 |
| OUTPUT | Water flow rate FR | % | O1 | O2 | O3 | O4 | O5 | O6 | O7 | O8 |
| OUTPUT | Water Quantity WQ | ml | P1 | P2 | P3 | P4 | P5 | P6 | P7 | P8 |
| OUTPUT | Pause Duration PT | sec | Q1 | Q2 | Q3 | Q4 | Q5 | Q6 | Q7 | Q8 |
| INPUT | "Coffee" coffee beverage | | | | | | | | | |
| INPUT | Double filter (x 2) | | | | | | | | | |
| INPUT | Granulometry level | | 1 | 2 | 3 | 4 | 5 | 6 | 7 | 8 |
| OUTPUT | Water flow rate FR | % | R1 | R2 | R3 | R4 | R5 | R6 | R7 | R8 |
| OUTPUT | Water Quantity WQ | ml | S1 | S2 | S3 | S4 | S5 | S6 | S7 | S8 |
| OUTPUT | Pause Duration PT | sec | T1 | T2 | T3 | T4 | T5 | T6 | T7 | T8 | fig. 3

MACHINE AND METHOD FOR PREPARING COFFEE BEVERAGES

CROSS-REFERENCE TO RELATED APPLICATIONS

This application is a Section 371 of International Application No PCT/IT2021/050201, filed Jun. 29, 2021, which was published in the English language on Jan. 6, 2022, under International Publication No. WO 2022/003743 A1, which claims priority under 35 U.S.C. § 119(b) to Italian Application No. 102020000015805, filed Jun. 30, 2020, the disclosures of each of which are incorporated herein by reference.

FIELD OF THE INVENTION

Embodiments described here concern a domestic or semi-professional machine which is preferably integrated in or communicates with a coffee grinder with variable granulometry, for preparing coffee beverages by infusing a dose of coffee powder, and corresponding method, which allow to adapt the pre-infusion parameters according to the settings made by a user in order to obtain an optimal extraction of the aromatic substances.

BACKGROUND OF THE INVENTION

It is known that in order to prepare a coffee beverage by infusing a coffee powder it is necessary to set and control a plurality of different setting variables, correlated to one or more components of the machine, which can influence the infusion process. In fact, the setting variables set, in turn, influence and determine the functioning parameters of the machine, on which the quality of the beverage prepared depends.

It is also known to carry out a pre-infusion step of the coffee powder before the actual infusion step, in order to wet the coffee powder in a homogeneous and uniform manner and to prevent the formation of preferential channels for the water through the dose of coffee, so as to optimize the quantity of soluble solids extracted from the roasted coffee.

It is known that it is possible to modify the settings of the pre-infusion step in order to optimize the quality of the beverage in the cup, but generally a high level of experience is required to optimize the settings.

With regard to the pre-infusion step, in fact, there are at least four independent parameters that can influence the quality of the coffee beverage, including the granulometry of the coffee powder, the quantity and flow rate of water during the pre-infusion step, the pressure during the pre-infusion step and the duration of the pause between the pre-infusion step and the infusion step.

In known semi- or fully automatic machines, the granulometry of the coffee powder is set according to the infusion step of the beverage, in particular to guarantee a desired infusion flow, and the user must set the other parameters manually.

This can be somewhat complicated in the case of machines for preparing coffee that allow only a minimum selection of the functioning parameters by the user, but in the case of more versatile machines, which offer more choice to the user, obtaining a correct adjustment can be very complex, and specific "barista" skills are in any case required.

Document KR-A-2020 0028971 describes a machine for preparing espresso coffee that uses a combination of a pressure control and pressure profile to control the flow of water into the coffee powder pod and to adjust the parameters in order to adapt them to variations in the coffee according to a consumer's preferences. In particular, document KR-A-2020 0028971 provides to detect the pressure of the coffee pod and to adjust the water flow accordingly. This solution therefore provides to carry out a feedback control of the pressure of the coffee powder pod in order to guarantee that it does not exceed a safety level and that the machine does not operate beyond its limits Document US-A-2018/0220832 describes a machine for preparing American type coffee.

There is therefore a need to perfect a machine and a method for preparing coffee beverages which can overcome at least one of the disadvantages of the state of the art.

One purpose of the present invention is to provide a machine for preparing coffee beverages which allows to obtain an optimal extraction of the aromatic substances from the coffee powder for each selection made by the user.

Another purpose is to obtain a machine for preparing coffee beverages which allows to adjust the parameters of the pre-infusion step simply and quickly, even for an inexperienced user.

Another purpose is to provide a method for preparing a coffee beverage which allows to obtain the best possible result in the cup for each selection made by a user.

Another purpose of the present invention is to provide a machine and to perfect a method for preparing a coffee beverage which allow even an inexperienced user to obtain an optimal adjustment of the functioning parameters.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, some embodiments described here concern a machine for preparing coffee, which overcomes the limits of the state of the art and eliminates the defects present therein.

In particular, the invention concerns an automatic or semi-automatic machine for preparing coffee, suitable to prepare a coffee beverage by infusing a coffee powder with a desired quantity of water. In particular, the machine in question is suitable to carry out a first pre-infusion step to moisten the coffee powder and an infusion step to extract the aromatic substances.

The machine can comprise, in a known manner, an infusion chamber configured to contain the dose of coffee powder, and a hydraulic circuit configured to feed hot water to the infusion chamber.

According to one aspect of the invention, the machine comprises a control and command unit configured to adapt at least one operating parameter of the step of pre-infusing the coffee powder, chosen at least from: pre-infusion water flow rate, quantity of pre-infusion water and pause duration at the end of the pre-infusion step, at least as a function of the granulometry of the coffee powder.

According to some embodiments, the machine comprises means for controlling the granulometry of the coffee powder suitable to control, that is, adjust and/or determine, the granulometry of the coffee powder, and the control and command unit is configured to communicate with the granulometry control means and consequently adapt at least one parameter of the pre-infusion step.

According to some embodiments, the control means can comprise granulometry adjustment devices, for example associated with a grinding device, by means of which a user can set a desired grinding level of the coffee powder.

According to possible variants, the control means can comprise devices configured to detect or determine the granulometry of the coffee powder present in the infusion chamber, and supply the data detected/determined to the control and command unit.

According to some embodiments, the control and command unit is configured to act at least on the pump in order to adapt the pre-infusion parameters.

According to some embodiments, the machine for preparing coffee beverages comprises selection means for selecting at least one type of beverage to be prepared chosen from an "Espresso" type coffee, an "Americano" type coffee, or a "Coffee" type coffee, and the control and command unit is configured to vary at least one operating parameter of the step of pre-infusing the coffee powder also as a function of the type of beverage chosen.

By "Espresso" coffee we mean a coffee beverage obtained by percolating a coffee powder with a small quantity of water (about 30 ml for 7-10 gr of powder) at high pressure; by "Americano" or "Long Black" coffee we mean a coffee obtained at high pressure as for the "Espresso" coffee, possibly diluted with a determinate quantity of hot water, which is added to the coffee in the case of the "Americano", or poured into the cup before the coffee in the case of the "Long Black"; while by "Coffee" coffee we mean a coffee obtained at low pressure.

According to some embodiments, the machine for preparing coffee beverages comprises selection means for selecting a quantity of coffee powder chosen from a single or double dose, or a type of filter holder to be used, chosen at least from a single filter holder or a double filter holder. In addition, the control and command unit is configured to vary at least one operating parameter of the step of pre-infusing the coffee powder also as a function of the quantity of coffee chosen, or the type of filter holder used.

According to some embodiments, the control and command unit has in its memory an algorithm for determining the at least one pre-infusion parameter. The algorithm, in particular, is configured to receive at input from the control and selection means data relating at least to the granulometry level of the coffee powder, and possibly also to the type of beverage and type of filter holder, or quantity of coffee powder chosen, and to supply at output a combination of pre-infusion operating parameters comprising two or more from pre-infusion water flow rate, pre-infusion water quantity and pause duration at the end of the pre-infusion step, based on the data received at input.

According to some embodiments, it can be provided that the algorithm provides to determine one or more parameters on the basis of predefined tables, and derive the remaining parameters from them. For example, the duration of the pre-infusion can be defined in advance, or it can be calculated as a function of flow rate, quantity of water, and pause duration.

According to some embodiments, the control and command unit can be configured to compare the granulometry determined on each occasion by the granulometry control means with a previous granulometry value determined and/or with predefined values, and consequently adjust one or more pre-infusion parameters.

In accordance with some embodiments, the control and command unit can be configured at least to increase the pause duration at the end of the pre-infusion as the granulometry level increases from a finer level to a coarser one.

In accordance with some embodiments, the control and command unit can be configured at least to decrease the flow rate of pre-infusion water as the granulometry level increases from a finer level to a coarser one.

In accordance with some embodiments, the control and command unit can be configured at least to decrease the quantity of pre-infusion water as the granulometry level increases from a finer level to a coarser one.

In accordance with other embodiments, the control and command unit can be configured to simultaneously adjust at least the quantity of water, the water flow rate and the pause duration at the end of the pre-infusion.

Some embodiments described here also concern a method to prepare a coffee beverage with an automatic or semi-automatic machine, comprising a pre-infusion step to make a dose of coffee powder moist, and an infusion step to extract the aromatic substances from the coffee powder and deliver a coffee beverage.

The method according to the invention provides to determine the granulometry of the coffee powder by means of granulometry control means and to adapt at least one operating parameter of the pre-infusion step chosen from: duration of the pre-infusion step, pre-infusion water flow rate, quantity of pre-infusion water and pause duration at the end of the pre-infusion step, at least as a function of the granulometry of the coffee powder determined by the granulometry control means.

Providing to adapt one or more of the operating parameters of the pre-infusion step in relation to the granulometry of the coffee powder allows to homogeneously and uniformly moisten and wet the dose of coffee powder for each selection and setting made by the user.

In the coffee machines that allow a high level of versatility in modifying the granulometry level of the coffee powder, the fact of using the same parameters for fine or coarse grinding levels does not allow to obtain an optimal result on every occasion. In fact, for example, by providing an average quantity and flow rate for the pre-infusion water, in the case of very fine powder, the latter may not get wet enough, while in the case of coarse powder, the water may be excessive and begin to extract the aromas before the infusion step, or come out of the infusion chamber before the infusion and delivery step is started.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 3 is a schematic representation of a table for adjusting the pre-infusion parameters in relation to the operating settings of the machine which can be used by a method according to the invention.

Figure 1:
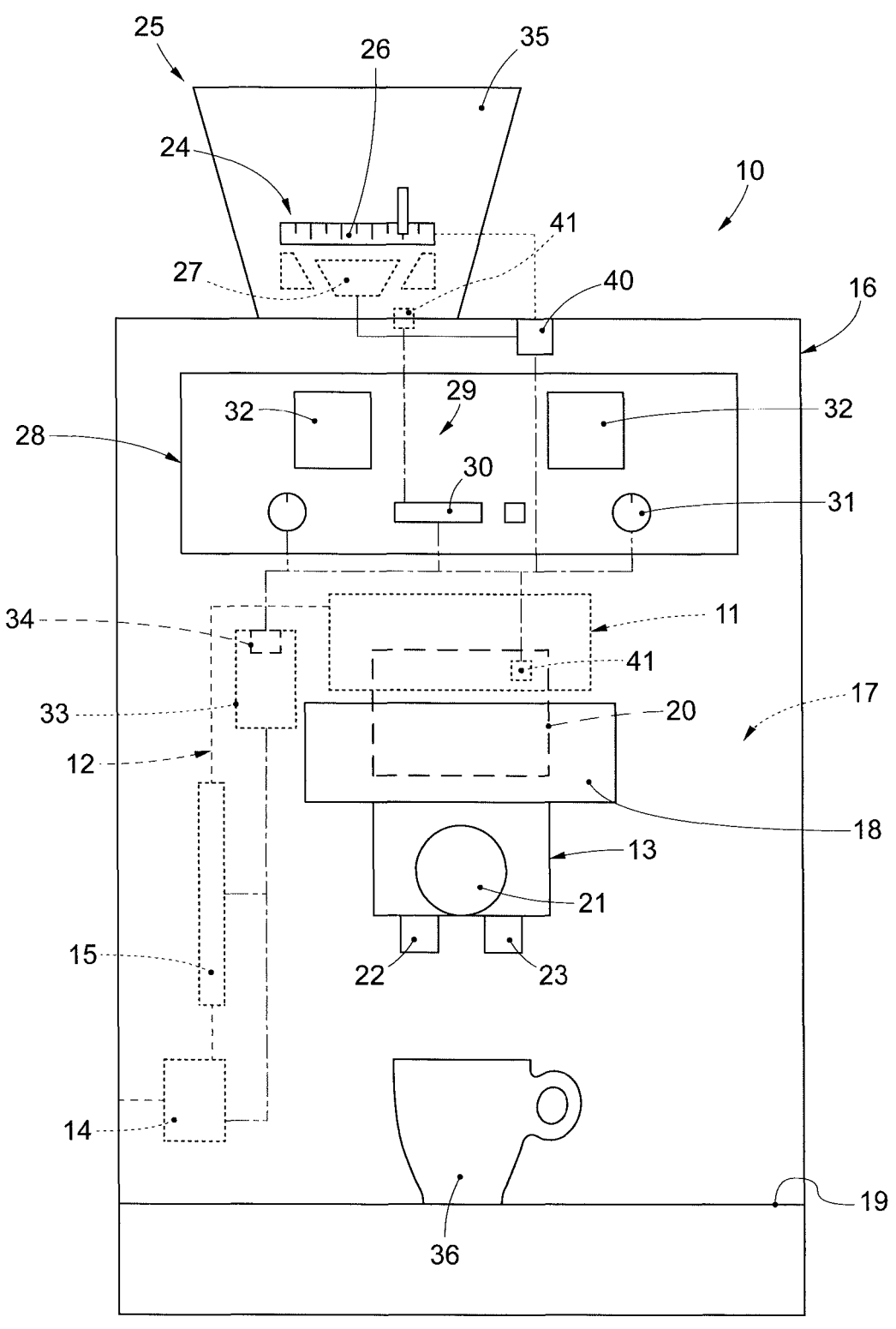
FIG. 1 is a schematic representation of a machine for preparing coffee beverages according to some embodiments described here.
Figure 2:
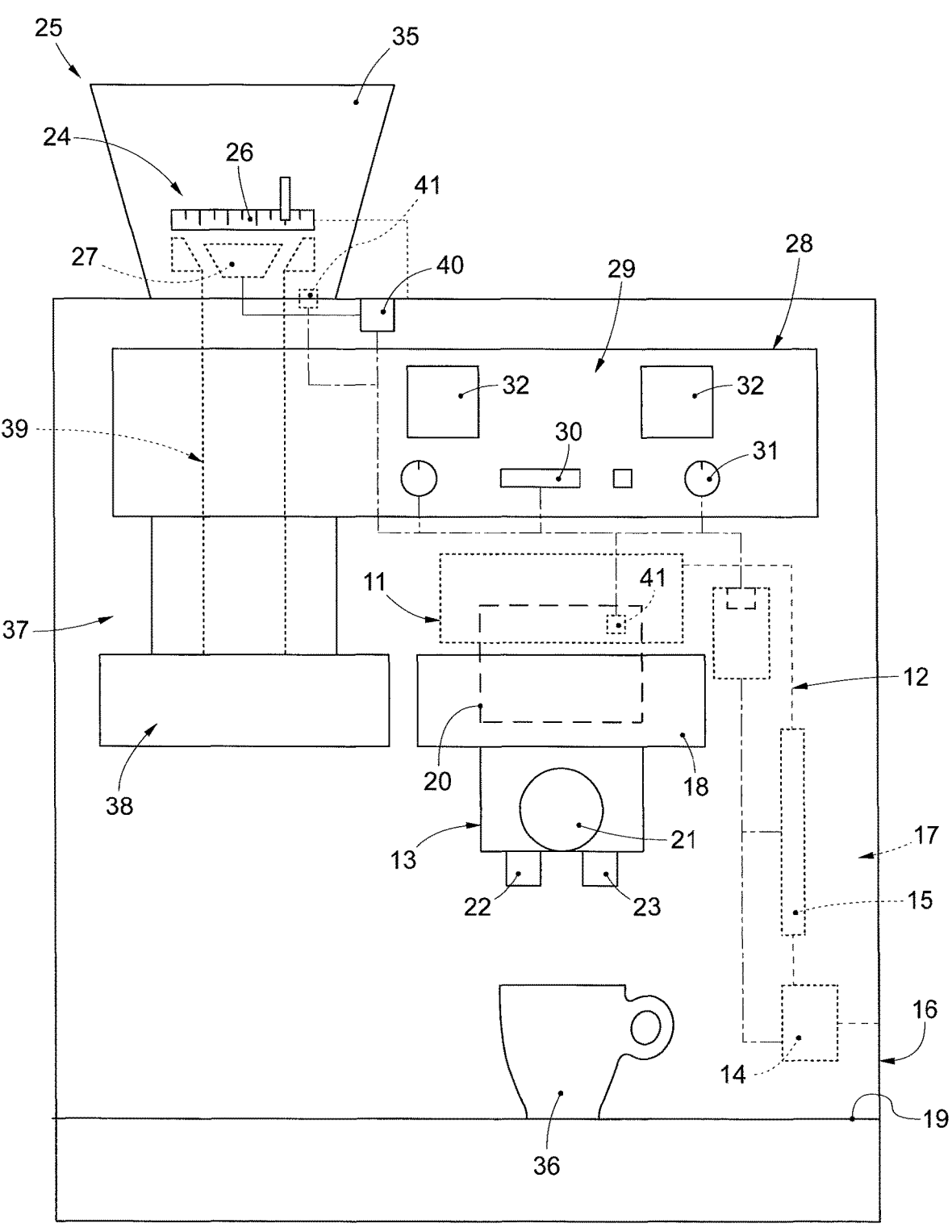
FIG. 2 is a schematic representation of a machine for preparing coffee beverages according to a variant.

To facilitate comprehension, the same reference numbers have been used, where possible, to identify identical common elements in the drawings. It is understood that elements and characteristics of one embodiment can conveniently be combined with or incorporated into other embodiments without further clarifications.

DETAILED DESCRIPTION OF SOME EMBODIMENTS

We will now refer in detail to the possible embodiments of the invention, of which one or more examples are shown in the attached drawings by way of a non-limiting illustration. The phraseology and terminology used here is also for the purposes of providing non-limiting examples.

Some embodiments described here with reference to FIG. 1 concern a machine 10 for preparing coffee beverages. Hereafter in the description, we will refer by way of example to a machine 10 of the semi-automatic type, in which the coffee powder is loaded, at least in part, manually. The invention, however, can also be applied to automatic or super-automatic machines in which the loading of the coffee powder and possibly also the removal of the exhausted powder are carried out automatically.

The machine 10 comprises an infusion unit 11, a hydraulic circuit 12 for feeding water to the infusion unit 11 and an infusion chamber 20 suitable to contain a dose of coffee powder.

According to some embodiments, the machine 10 comprises a filter holder 13 that can be engaged in a removable manner onto a support structure 18.

In the filter holder 13 there can be inserted and housed a filter for the coffee powder which, depending on the type of beverage to be prepared and on the organoleptic characteristics desired, can be chosen from a filter suitable to contain a single dose of coffee powder, or a filter suitable to contain a double dose of coffee powder.

According to these solutions, the infusion chamber 20 is defined partly by the infusion head 11 and partly by the filter holder 13.

The hydraulic circuit 12 connects the infusion head 11 to a source of water (not shown), which can be a tank that can be filled on each occasion, or even a water network of a building.

The hydraulic circuit 12 comprises a feed pump 14 and a boiler 15 disposed in succession to each other along the path of the water.

Along the hydraulic circuit 12 there can also be provided detection devices, not shown, configured to detect one or more actual parameters of the water in transit, such as quality, quantity, flow rate, temperature.

The machine 10 also comprises a frame 16 that defines a compartment 17 suitable to house the infusion head 11 and the other components of the machine 10.

According to some variants described with reference to FIG. 1, the filter holder 13 is outside the compartment 17, and during use it is attached to the support structure 18 associated with the frame 16.

The support structure 18 is disposed in a raised position with respect to a support plane 19 on which a receptacle 36, such as a cup or small cup, can be positioned.

The filter holder 13 can comprise, in a known manner, a handle 21 to allow a user to grip it, and at least one dispenser provided with at least one outlet nozzle 22 or 23 for the coffee beverage.

According to some embodiments, for example shown in FIG. 1, the filter holder 13 comprises two outlet nozzles 22, 23 for the coffee beverage, so as to allow two coffee beverages to be prepared and dispensed simultaneously.

According to some embodiments, not shown, in the case of automatic or super-automatic machines, the infusion chamber 20 is inside the compartment 17, and is connected to a dispenser provided with one or two nozzles 22, 23, said dispenser being able to be at least partly disposed outside the frame 16.

The machine 10 also comprises granulometry control means 24 configured to control the granulometry of the coffee powder in the filter holder 13 or in the infusion chamber 20. By granulometry control means 24 we mean means that are suitable to adjust and set a priori a determinate level of granulometry to be obtained, or also means suitable to find and identify a posteriori the granulometry of the coffee powder present in the infusion chamber 20.

According to some embodiments, the machine 10 comprises a grinding device 25 suitable to grind coffee beans.

The grinding device 25 can be integrated into the machine 10, or be separate and possibly connected to it.

The grinding device 25 can comprise a hopper 35 into which coffee beans can be introduced, and grinding means 27, for example a pair of grinders rotating with respect to each other.

In particular, the grinding device 25 can comprise a rotating grinder and a non-rotating grinder both coaxial with respect to an axis and delimiting an interstice where the grinding is carried out, the width of which determines the granulometry of the powder obtained.

According to some embodiments, the granulometry control means 24 can comprise granulometry adjustment means 26 by means of which a user can select the desired granulometry to which the coffee powder is ground.

The granulometry adjustment means 26 can be configured to determine the translation of the non-rotating grinder parallel to the axis, so as to modify its position with respect to the rotating grinder and thus vary the width of the interstice.

According to these embodiments, the granulometry adjustment means 26 can be of the manual or motorized type.

For example, the granulometry adjustment means 26 can comprise a ring nut, or other mechanical device, which can be driven manually by a user and be directly associated with the grinding device 25 or with the grinders 27. In this case, by acting on the adjustment means 26 the user directly adjusts the reciprocal distance between the grinders 27.

According to possible variants, the adjustment means 26 can comprise a knob, or other electronic control device, by means of which a user can select a desired granulometry level and determine the activation of a motor member that reciprocally positions the grinders 27 at a correlated distance.

According to some embodiments, the control means 24 can comprise a sensor 40 suitable to detect the position of the adjustment means 26 and/or the position of the grinders 27.

According to some embodiments, the sensor 40 can comprise a potentiometer connected to a rotary transducer, which detects a linear variation in the resistance correlated to the position of the adjustment means 26.

According to other variants, the sensor 40 can be an encoder configured to detect the position of one or both grinders and convert the data detected into signals correlated to a set grinding level.

According to some embodiments, the granulometry adjustment means 26 can be configured to allow the selection of a plurality of grinding levels.

For example, as shown in the table in FIG. 3, 8 grinding levels can be provided, varying progressively between a minimum value (1), corresponding to a very fine granulometry, and a maximum value (8), corresponding to a coarse granulometry.

The total number of grinding levels, however, can vary as a function of requirements and of the type of grinding device 25 used, and for example be comprised between 2 and 20.

According to some embodiments, the number of grinding levels is greater than or equal to four, providing at least a "very fine" level, a "fine" level, a "medium" level and a "coarse" level.

Preferably, the total number of grinding levels is comprised between 6 and 16.

By way of example, each level corresponds to a determinate reciprocal position between the two grinders 27, that is, a thickness of the interstice between them.

According to possible variants, not shown, the granulometry control means 24 can comprise devices for determining the distance between the grinders, such as the sensor 40, or optical devices 41 suitable to acquire an image of the coffee powder and processing means suitable to process the image acquired and determine an average granulometry of the coffee powder, for example by comparing the image acquired with a plurality of stored reference images, each correlated to a grinding level.

The optical devices 41 can be provided in a grinding zone of the grinding device 25, or possibly in the infusion chamber 20.

According to other embodiments, the granulometry control means 24, in addition or as an alternative to the previous ones, can comprise devices for the indirect detection of the granulometry, for example sensors configured to measure one or more of either the pressure or the flow of the infusion water, and determine the granulometry of the coffee powder in the infusion chamber 20 on the basis of the data detected.

According to other variants, not shown, the granulometry control means 24 can comprise a selector, a button, or a data entry device, by means of which a user can enter the grinding level of the coffee powder used, or desired.

According to some variants, the grinding device 25 can comprise a volumetric metering device, so as to supply on each occasion the correct quantity of powder correlated to the granulometry chosen by means of the granulometry control means 24.

According to some embodiments, in the case of a semi-automatic machine 10 there can be provided a dispensing and pressing station 37 for the coffee powder, in correspondence with which a user can load a dose of coffee powder into the filter holder 13 and possibly compress it. The dispensing and pressing station 37 can comprise a support body 38, connected by means of a duct 39 to the grinding device 25, to which a filter holder 13 can be attached. Along the duct 39, there can be provided interception devices to allow or prevent the passage of the coffee powder. Preferably, the support body 38 is positioned below the grinding device 25, aligned with it, so that the powder can be fed by gravity when the interception devices allow it to pass.

It is known that the granulometry of the coffee powder greatly influences the final in cup result, and moreover, types of coffee beans that differ by origin, composition, or roasting degree, require different grinding levels. Providing a large number of possibilities of grinding levels gives the machine 10 versatility, making it suitable to be used with different types of coffee beans.

The machine 10 also comprises a user interface 28 provided with selection means 29 by means of which a user can select and set one or more operating variables. These operating variables can be chosen by separate commands.

In particular, there can be provided a command 30 for selecting the type of filter holder 30 by means of which the user can choose whether to use a "single" filter, that is, suitable to contain a single dose of coffee powder and therefore prepare a single dose of coffee beverage in the cup, or a "double" filter suitable to contain a double dose of coffee powder to consequently prepare a double dose of coffee beverage.

A beverage selection command 31 can also be provided, by means of which the user can select a type of beverage to be prepared, for example an Espresso type coffee, an Americano type coffee, or a Coffee type coffee, although other types of beverages can also be provided.

Additional commands and/or display devices 32 can also be provided, in the form of buttons, keys, knobs, or a screen, by means of which a user can choose and select additional settings, including the temperature of the water, the pressure of the water, the intensity of the flavor of the beverage, possibly also the type of coffee beans used, etc. and/or view the variables that have been set.

Hereafter, the commands 30, 31 and 32 can also be identified as a whole with number 29.

The machine 10 also comprises a control and command unit 33 in communication with the pump 14, the boiler 15, the infusion unit 11, and possibly, if present, the grinding device 25, and configured to adjust the functioning thereof in relation to the selections made by a user by means of the granulometry control means 24 and the selection means 29.

According to some embodiments, the control and command unit 33 can receive information on the granulometry of the coffee powder present on each occasion in the infusion chamber 20 as a function of the position of the adjustment means 26 set by a user and detected for example by the sensor 40.

According to possible variants, the control and command unit 33 can receive indications regarding the granulometry by means of the optical devices 41, the sensors for measuring the pressure or flow of the water, or on the basis of data supplied by a user.

The control and command unit 33, in particular, is configured to adapt at least one operating parameter of the pre-infusion step as a function at least of the granulometry level of the coffee powder.

According to some embodiments, the control and command unit 33 is configured to determine one or more operating parameters of the pre-infusion step as a function of two or more from granulometry level of the coffee powder, the type of coffee beverage to be prepared and the type of filter holder 13, or the quantity of coffee powder to be used.

According to some embodiments, the control and command unit 33 is configured to vary one or more operating parameters of the pre-infusion step as a function of the granulometry level of the coffee powder, the type of coffee beverage to be prepared and the type of filter holder 13 to be used or a quantity of coffee powder, chosen between a single or double dose.

According to some embodiments, the operating parameter or parameters of the pre-infusion step can comprise one or more from pre-infusion time, flow rate and quantity of pre-infusion water, and pause duration between the pre-infusion step and the infusion step.

According to some embodiments, the control and command unit 33 is configured to command at least the pump 14 in order to adjust the one or more pre-infusion parameters. According to some embodiments, the water flow rate can be adjusted by reducing the functioning of the pump 14 with respect to its maximum nominal flow rate. By way of example, if a flow rate of the flow of water equal to 70% of a maximum value is required, the pump 14 will be reduced accordingly, keeping it active only for a correlated percentage of time. In this way, it is possible to feed the water in the pre-infusion step with a lower flow rate, and therefore with a slower flow, and increase it, possibly reaching the maximum flow rate of 100%, during the infusion step.

According to some embodiments, it can be provided that the flow rate of the pump is progressively increased during the pre-infusion step according to a ramp-up that has a gradient that varies as a function of the granulometry level, and possibly the type of beverage and/or the type of filter holder 13, or dose of coffee powder.

At the end of the pre-infusion step, by stopping the pump 14 it is possible to provide a pause time of a desired duration, in order to allow the pre-infusion water to uniformly wet the coffee powder.

According to some embodiments, the control and command unit 33 can be configured to implement an algorithm by means of which to select on each occasion the pre-infusion operating parameters optimized on the basis of the settings made by the user and the input variables received.

The algorithm can be programmed to receive as input variables the information relating to one or more from granulometry level, type of beverage to be prepared, type of filter/quantity of coffee powder to be used, and supply as output the operating parameters to be used during the pre-infusion step.

According to other variants, the control and command unit 33 comprises a memory unit 34 in which a plurality of pre-infusion profiles are stored, each associated with a combination of parameters that can be chosen by a user.

FIG. 3 shows, by way of example, a table containing a plurality of pre-infusion profiles, from which it is evident that for each combination of the operating variables chosen by the user in relation to granulometry level, Espresso, Americano or Coffee beverage type, and type of filter/quantity of coffee powder to be used, single or double, there corresponds a specific combination of pre-infusion parameters to be used.

For each block, there are defined the output operating parameters provided for each combination of input variables, that is, flow rate FR, quantity of water WQ and pause duration PT, and for each of the different granulometry levels considered, in this case from 1, corresponding to "very fine", to 8, corresponding to "coarse".

In this way, it is possible to use optimized pre-infusion parameters that allow on the one hand to wet the coffee powder uniformly, and on the other hand to provide sufficient time to allow the aromatic substances to come out, so as to obtain the best possible coffee for each selection made by the user.

For example, for the same type of beverage and type of filter used, in the case of a powder with a fine granulometry, there can be provided a greater quantity of pre-infusion water than that provided for a powder with a large granulometry, and a pause having a shorter duration.

According to some embodiments, the quantity of water WQ decreases as the granulometry increases, so that the value corresponding to a granulometry level n+1 is always greater than or equal to the value corresponding to the level n (for example, B3≥B2; E4≥E3; S6≥S5 and so on), with the other input variables being the same.

According to some embodiments, the quantity of water WQ can decrease progressively for each level, or for groups of levels. In particular, it can be provided that the quantity of water varies in a more evident and significant manner in those levels corresponding to a "very fine" or "fine" granulometry (in the case of FIG. 3, from 1 to 4), and in a smaller manner for the "medium" or "coarse" levels (in the case of FIG. 3, from 5 to 8). By way of example, it can be provided that the quantity of water WQ in the levels from "very fine" to "fine" varies progressively for each level, for example by a quantity comprised between 2 and 10 ml, and that for the remaining levels it remains constant, or varies by a smaller quantity, for example comprised between 1 and 5 ml.

By way of a non-limiting example, in the case of an Espresso type beverage with a single filter, the quantity of water WQ can vary between a maximum value B1 equal to approximately 25 ml, and a minimum value B8 equal to approximately 15 ml, while in the case of an Americano type beverage with double filter, the quantity of water WQ can vary between a maximum value H1 equal to approximately 45 ml, and a minimum value H8 equal to approximately 8 ml.

According to some embodiments, for the same granulometry level and type of beverage, the quantity of water WQ for a single filter (Bn, Hn, Pn) can be comprised between 50% and 60% of the quantity of water WQ used for a double filter (En, Mn, Sn).

According to some embodiments, the water flow rate FR can decrease in proportion to the increase in granulometry, so that the value corresponding to a granulometry level n+1 is always greater than or equal to the value corresponding to the level n (for example, A3≥A2; D4≥D3; R6≥R5 and so on).

By way of example, the water flow rate FR, in the case of an Espresso type coffee, can vary between a maximum value A1 equal to approximately 80%, and a value A8 equal to approximately 50% in the case of a single filter. In the case of a double filter, the water flow rate FR can be slightly lower, for example by 5-15%.

According to possible variants, the water flow rate FR can remain constant for all, or for some, of the granulometry levels.

According to possible embodiments, in the case of a "Coffee" type beverage, the water flow rate FR during pre-infusion can be lower than that provided for the other types of beverage, for example comprised between 45% and 55%.

According to some embodiments, with granulometry level and type of beverage remaining the same, the water flow rate FR for a single filter (An, Gn, On) can be greater than or equal to the water flow rate FR for a double filter (Dn, Ln, Rn).

According to some embodiments, the pause duration PT increases proportionally to the increase in granulometry, in a linear manner, or with a stepped trend, providing a same value for groups of levels. In any case, the pause duration PT corresponding to a level n+1 will always be smaller than or equal to the pause duration PT corresponding to level n, all other input variables remaining the same.

According to some embodiments, with granulometry level and type of beverage remaining the same, the pause duration PT for a single or double filter can be substantially the same.

In the case of a "Coffee" type beverage, it can be provided that, with granulometry level remaining the same, the pause duration PT can be greater than the pause duration PT provided for the other types of beverages.

The pause duration PT, depending on the input variables, can, as an indication, vary between 0 sec and 4 sec. In particular, in the case of "very fine" granulometry, the pause PT between the pre-infusion step and the infusion step can be substantially zero.

According to possible variants, it can also be provided that in the case of a "Coffee" type beverage there is not an actual pre-infusion step, but that its parameters substantially correspond to those used for the infusion step.

In this way, the machine 10 is substantially capable of self-adjusting without the need for a user to manually intervene on the operating parameters of the pre-infusion.

This solution is particularly advantageous in the case of a machine 10 comprising, or connected to, a coffee bean grinding device 25, allowing on the one hand the possibility of selecting a desired granulometry of the coffee powder, and on the other hand to automatically adapt, substantially without the need for user interventions, the pre-infusion parameters, so as to optimize the extraction of the aromatic substances from the coffee powder.

According to some embodiments, the control and command unit 33 can also be configured to compare the granulometry determined on each occasion by the granulometry control means 24 with a previous granulometry value determined and/or with predefined granulometry values, and consequently increase and/or decrease one or more parameters between pause duration at the end of the pre-infusion, pre-infusion water flow rate, quantity of pre-infusion water as a function of the increase in granulometry level between a finer level and a coarser one, or vice versa in the opposite case.

In particular, as the granulometry level increases from a finer level to a coarser one, it is provided to increase the pause duration and to decrease the flow rate and quantity of pre-infusion water.

The control and command unit 33 can also be configured to also adjust the operating parameters to be used in the infusion step for each selection made by the user.

By way of example, the control and command unit 33 can be configured to vary at least one infusion operating parameter chosen from water quantity, water flow rate, infusion time, water temperature, or other, as a function of the settings made by the user in relation to one or more from granulometry level, type of beverage to be prepared, and type of filter/quantity of coffee powder to be used.

Some embodiments described here also concern a method to prepare a coffee beverage, comprising a pre-infusion step, during which a first quantity of water is fed to the infusion unit 11 to make a dose of coffee powder contained in the infusion chamber 20 moist, and an infusion step, during which a second quantity of water is dispensed to extract aromatic substances from the coffee powder and dispense a coffee beverage.

The method provides, at least during the pre-infusion step, to determine the granulometry of the coffee powder by means of granulometry control means 24 and to adjust at least one operating parameter of the step of pre-infusing the coffee powder chosen from: pre-infusion water flow rate FR, pre-infusion water quantity WQ and pause duration PT at the end of the pre-infusion step, at least as a function of the granulometry level of the coffee powder determined.

According to some embodiments, the method provides to receive, by means of a selection command 31 for selecting the type of beverage, the selection of a type of beverage to be prepared chosen from an Espresso type coffee, an Americano type coffee, and a "Coffee" type coffee, and to consequently vary at least one operating parameter of the step of pre-infusing the coffee powder also as a function of the type of coffee chosen.

According to some embodiments, the method provides to receive, by means of a selection command 30, the selection of a single filter holder or a double filter holder, or of a single or a double dose of coffee powder, and to consequently vary at least one operating parameter of the step of pre-infusing the coffee powder also as a function of the type of filter holder/dose of coffee powder chosen.

According to other variants, in order to determine the at least one pre-infusion parameter, the method provides to execute an algorithm for determining the at least one pre-infusion parameter.

In particular, the method provides to receive at input, by means of the control 24 and selection 29 means, data relating to the granulometry level, type of beverage and type of filter holder/quantity of coffee powder chosen, as operating variables, and supply at output a combination of pre-infusion operating parameters comprising one or more from pre-infusion water flow rate FR, pre-infusion water quantity WQ and pause duration PT at the end of the pre-infusion step, on the basis of the data received at input.

According to some embodiments, the method provides to supply at output a combination of at least two pre-infusion operating parameters chosen from pre-infusion water flow rate FR, pre-infusion water quantity WQ and pause duration PT at the end of the pre-infusion step, on the basis of the data received at input.

According to some variants, the method provides, for each combination of operating variables supplied at input in relation to the granulometry of the coffee powder, and possibly one or more from type of beverage and type of filter chosen, to select, from the plurality of profiles stored in the memory unit 34, the pre-infusion profile associated with such combination of variables.

According to some embodiments, the pre-infusion profile comprises the values of one or more of either water flow rate FR, quantity of water WQ or pause duration PT.

According to other embodiments, the method provides to also supply at output a duration time of the pre-infusion step. This value can be determined a priori, and stored in each profile, or calculated on the basis of the other parameters.

It is clear that modifications and/or additions of parts or steps may be made to the machine 10 and to the method for preparing coffee beverages as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. An automatic or semi-automatic machine for preparing coffee beverages by infusing a dose of coffee powder, wherein the machine comprises a control and command unit configured to adapt at least a pause duration at the end of a pre-infusion step, at least as a function of a granulometry of said coffee powder determined by a granulometry control means, wherein the machine comprises a selection means for selecting at least one type of coffee beverage, wherein said control and command unit comprises a memory unit in which a plurality of pre-infusion profiles are stored, each associated with a combination of input operating variables comprising the granulometry, the type of beverage, a type of filter holder, or a quantity of coffee powder in the dose of coffee powder, and said control and command unit is configured to receive at input the data supplied by said granulometry control means and the selection means as operating variables, and to supply at output a pre-infusion profile, including the pause duration at the end of the pre-infusion step, water flow rate, pre-infusion water quantity and pause duration at the end of the pre-infusion step, associated with the combination of data supplied by said control and selection means.

2. The machine as in claim 1, wherein the machine comprises a grinding device configured to grind coffee beans associated with adjustment means for adjusting the granulometry of said coffee powder which is chosen by a user.

3. The machine (10) as in claim 1, wherein said control and command unit is consequently configured to vary at least one operating parameter of the pre-infusion step as a function of said type of coffee beverage chosen.

4. The machine as in claim 1, wherein the machine comprises selection means for selecting at least one type of filter holder chosen from a single filter holder or a double filter holder, or a single or double dose of coffee powder, and said control and command unit is consequently configured to vary at least one operating parameter of the pre-infusion step on the basis of the type of filter holder chosen.

5. The machine as in claim 1, wherein said control and command unit is configured at least to compare said determined granulometry with a previous granulometry value and to decrease the pre-infusion water flow rate as a function of the increase in granulometry level from a finer level to a coarser one.

6. The machine as in claim 1, wherein the pre-infusion profile includes a pre-infusion water flow rate and a pre-infusion water quantity.

7. An automatic or semi-automatic machine for preparing coffee beverages by infusing a dose of coffee powder, wherein the machine comprises a control and command unit configured to adapt at least a pause duration at the end of a pre-infusion step, at least as a function of the granulometry of said coffee powder determined by a granulometry control means, wherein said control and command unit is configured to compare said determined granulometry with a previous granulometry value, and as the determined granulometry level increases from a finer level to a coarser one, the control and command unit is configured to command the functioning of said machine at least to increase the pause duration at the end of the pre-infusion step, wherein said control and command unit is configured at least to compare said determined granulometry with the previous granulometry value and to decrease a pre-infusion water flow rate as a function of the increase in granulometry level from a finer level to a coarser one.

8. The machine as in claim 7, wherein the control and command unit is configured to supply at output a pre-infusion profile, including the pause duration, a pre-infusion water flow rate, and a pre-infusion water quantity.

9. A method to prepare a coffee beverage with an automatic or semi-automatic machine (10), by infusing a coffee powder, comprising a pre-infusion step to make the coffee powder moist, and an infusion step to extract the aromatic substances from the coffee powder, wherein said method provides to determine the granulometry of said coffee powder by means of granulometry control means and consequently adapt at least a pause duration at the end of the pre-infusion step as a function of the granulometry determined, wherein said control and command unit is configured to compare said determined granulometry with a previous granulometry value, and as the determined granulometry level increases from a finer level to a coarser one, the control and command unit is configured to command the functioning of said machine at least to increase the pause duration at the end of the pre-infusion step, wherein said control and command unit is configured at least to compare said determined granulometry with the previous granulometry value and to decrease a pre-infusion water flow rate as a function of the increase in granulometry level from a finer level to a coarser one.

10. The method as in claim 9, wherein in order to determine the granulometry of the powder the method provides to receive the indication of a granulometry level set by a user by means of granulometry adjustment means associated with a grinding device for grinding coffee beans.

11. The method as in claim 9, wherein the method provides to receive, by means of selection means, the selection of a type of coffee beverage to be prepared, and consequently vary at least one of its operating parameters of the pre-infusion step.

12. The method as in claim 9, wherein it the method provides to receive, by means of selection means, the selection of a filter holder to be used, chosen between a single filter holder or a double filter holder, or a dose of coffee powder, chosen between single or double, and consequently vary at least one operating parameter of the pre-infusion step.

13. The method as in claim 9, wherein in order to adapt the at least one pre-infusion parameter, the method provides to receive at input the data supplied by control and selection means relating to the granulometry level, type of beverage and type of filter holder, or dose of coffee powder as operating variables, and select, among a plurality of pre-infusion profiles stored in a memory unit, one pre-infusion profile, comprising one or more operating parameters from pre-infusion water flow rate, pre-infusion water quantity and pause duration at the end of the pre-infusion step, associated with the combination of input data supplied by said control and selection means.

14. The method as in claim 9, wherein the method provides to decrease the quantity of pre-infusion water as the granulometry level increases from a finer level to a coarser one.

\* \* \* \* \*